United States Patent
Komatsu et al.

(10) Patent No.: US 10,131,576 B2
(45) Date of Patent: Nov. 20, 2018

(54) METHOD FOR OPERATING CEMENT PLANT

(71) Applicant: MITSUBISHI MATERIALS CORPORATION, Chiyoda-ku (JP)

(72) Inventors: Takuya Komatsu, Naka (JP); Yoshinori Takayama, Naka (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 59 days.

(21) Appl. No.: 14/916,465

(22) PCT Filed: Jun. 30, 2014

(86) PCT No.: PCT/JP2014/003457
§ 371 (c)(1),
(2) Date: Mar. 3, 2016

(87) PCT Pub. No.: WO2015/045227
PCT Pub. Date: Apr. 2, 2015

(65) Prior Publication Data
US 2016/0214893 A1    Jul. 28, 2016

(30) Foreign Application Priority Data

Sep. 30, 2013    (JP) ................... 2013-204005

(51) Int. Cl.
*C04B 7/43*      (2006.01)
*F27B 7/10*      (2006.01)
(Continued)

(52) U.S. Cl.
CPC ........... *C04B 7/434* (2013.01); *C04B 7/006* (2013.01); *C04B 7/4407* (2013.01); *F23N 5/006* (2013.01);
(Continued)

(58) Field of Classification Search
CPC .................. C04B 7/434; C04B 7/006
(Continued)

(56) References Cited

U.S. PATENT DOCUMENTS 3,366,374 A * 1/1968 Bay ..................... F27B 7/42
432/23
3,923,536 A * 12/1975 Kobayashi ............ C04B 7/434
106/747
(Continued)

FOREIGN PATENT DOCUMENTS

JP    52-000931 A    1/1977
JP    63-074944 A    4/1988
(Continued)

OTHER PUBLICATIONS

International Search Report dated Sep. 30, 2014 for PCT/JP2014/003457 filed on Jun. 30, 2014.

*Primary Examiner* — Steven B McAllister
*Assistant Examiner* — John Bargero
(74) *Attorney, Agent, or Firm* — Oblon, McClelland, Maier & Neustadt, L.L.P.

(57) ABSTRACT

There is provided a method for operating a cement plant capable of simultaneously optimizing both combustion in a calciner and a heat consumption rate. The method for operating a cement plant includes: feeding first fuel to a calciner; feeding second fuel for maintaining the inside at a burning temperature to a cement kiln along with combustion primary air, and introducing air for cooling cement clinker to a cooler; and feeding a part of the air as secondary air to the cement kiln, feeding as tertiary air to the calciner, and discharging the rest of the air from the cooler, wherein relation between a first oxygen concentration at an exhaust gas outlet of the calciner and a heat consumption rate determined by the first fuel and the second fuel, and relation between a second oxygen concentration at an exhaust gas (Continued)

outlet of the preheater and the heat consumption rate are beforehand obtained, and amounts of the secondary air and the tertiary air are adjusted such that both the first oxygen concentration and the second oxygen concentration fall within a range including values of the oxygen concentrations at which the heat consumption rate becomes at its minimum.

4 Claims, 4 Drawing Sheets

(51) Int. Cl.
| | | |
|---|---|---|
| *F23N 5/00* | (2006.01) | |
| *F27B 7/20* | (2006.01) | |
| *F27D 99/00* | (2010.01) | |
| *C04B 7/44* | (2006.01) | |
| *C04B 7/00* | (2006.01) | |
| *F27D 17/00* | (2006.01) | |

(52) U.S. Cl.
CPC ............... *F27B 7/10* (2013.01); *F27B 7/20* (2013.01); *F27D 99/0033* (2013.01); *F23N 2023/40* (2013.01); *F27D 2017/009* (2013.01)

(58) Field of Classification Search
USPC .............................................. 432/5
See application file for complete search history.

(56) References Cited

U.S. PATENT DOCUMENTS

| | | | |
|---|---|---|---|
| 3,975,148 A * | 8/1976 | Fukuda | C04B 7/434 432/106 |
| 5,882,190 A | 3/1999 | Doumet | |
| 6,488,765 B1 * | 12/2002 | Tseng | C04B 7/434 106/739 |
| 2001/0044089 A1 | 11/2001 | Marin et al. | |
| 2011/0044880 A1 * | 2/2011 | Shima | C04B 7/367 423/437.1 |

FOREIGN PATENT DOCUMENTS

| | | |
|---|---|---|
| JP | 02-22016 B2 | 5/1990 |
| JP | 2000-281400 A | 10/2000 |
| JP | 2001-524449 A | 12/2001 |
| JP | 2009-215097 A | 9/2009 |
| JP | 2010-235334 A | 10/2010 |

* cited by examiner

METHOD FOR OPERATING CEMENT PLANT

TECHNICAL FIELD

The present invention relates to a method for operating a cement plant including a calciner.

BACKGROUND ART

Conventionally, there is known a cement plant in which an auxiliary combustion furnace (hereinafter referred to as calciner in the description) is provided upstream of a cement kiln that burns a raw material, so that a part of the raw material preheated in a preheater is heated to promote decarbonation (for calcining), and thereby, load on the cement kiln is reduced.

Further, an operation method is proposed, for example, in Patent Literature 1 below for efficiently burning fuel (pulverized coal or the like) inputted to the calciner in a cement plant in which the calciner of this type is provided.

CITATION LIST

Patent Literature

Patent Literature 1: Japanese Patent Publication No. 2-22016

SUMMARY OF INVENTION

Technical Problem

However, in the conventional method for operating the aforementioned cement plant, when amounts of pulverized coal and combustion air inputted to the calciner are in excess for optimizing combustion in the calciner, although a reaction ratio of the raw material in the calciner increases, sensible heat of the exhaust gas discharged from the calciner increases instead, which causes increase of a heat consumption rate (heat amount required for producing 1 kg of clinker) which is a heat consumption amount in the whole burning process, and thus, problematically causes high production costs.

The present invention is devised in view of the aforementioned circumstances, and an object thereof is to provide a method for operating a cement plant capable of simultaneously optimizing both combustion in a calciner and a heat consumption rate

Solution to Problem

Typically, in a cement plant, fuel required for maintaining the inside at the burning temperature of a raw material is fed through a main burner of a cement kiln along with combustion air (primary air), and cooling air is fed to a cooler for cooling burnt clinker at a certain flow rate. Further, a part of the air which becomes at high temperature by heat exchange with the clinker in the cooler is fed inside the cement kiln as secondary air for assisting the combustion air, another part of the air is fed to the calciner as combustion air (tertiary air), and the rest of the air is directly discharged from the cooler.

Accordingly, for example, when the flow rate of the combustion air fed to the calciner is increased, the exhaust flow rate from the cooler decreases. Further, increase of the flow rate of the combustion air in the calciner causes increase of the flow rate of the preheater exhaust gas discharged from the preheater, which results in a high value of the heat consumption rate. Conversely, when the flow rate of the combustion air fed to the calciner is reduced, the flow rate of the direct exhaust from the cooler increases, and therefore, latent heat of the exhaust gas that has become at high temperature by heat exchange with the clinker is not used to be discarded, which similarly causes a poor heat consumption rate.

Regarding the above, the inventors have obtained a knowledge that since when the cooling air is fed to the cooler at a certain flow rate, increases or decreases of the exhaust gas from the preheater and the exhaust gas from the cooler are in trade-off relation in the whole burning process, the heat consumption rate can be made at its minimum if the flow rate of the tertiary air is adjusted such that the sum of the sensible heats of these exhaust gases becomes at its minimum.

However, in actual operation of the cement plant, it is difficult to directly detect the flow rates of the exhaust gas from the preheater and the exhaust gas from the cooler.

Meanwhile, an oxygen ($O_2$) concentration meter is typically installed at the exhaust gas outlet of the calciner for confirming the combustion state in the calciner.

Regarding the above, the inventors have obtained a knowledge that relation between the $O_2$ concentration in the exhaust gas from the preheater and the heat consumption rate and relation between the $O_2$ concentration in the exhaust gas from the calciner and the heat consumption rate can be obtained by calculating material balances and the heat consumption rate in the whole burning process in process simulation where each of the facilities such as the preheater, the calciner, the cement kiln and the cooler in the cement plant is divided into units called unit operations and a macroscopic reaction and heat exchange in each facility are described.

The present invention is achieved based on such knowledge as above, and the invention according to claim 1 is a method for operating a cement plant which includes a preheater that preheats a raw material, a calciner that calcines at least part of the raw material picked out of the preheater, a cement kiln that burns the raw material passed through the preheater and the calciner into cement clinker, and a cooler that cools the cement clinker discharged from the cement kiln, the method comprising: feeding first fuel in an amount required for calcining the introduced raw material to the calciner; feeding second fuel in an amount required for maintaining an inside at a burning temperature to the cement kiln along with combustion primary air, and introducing air in a certain amount for cooling the cement clinker to the cooler; and feeding a part of the air as secondary air for assisting combustion of the second fuel to the cement kiln, feeding another part of the air as tertiary air for combustion of the first fuel to the calciner, and discharging the rest of the air from the cooler, wherein relation between a first oxygen concentration at an exhaust gas outlet of the calciner and a heat consumption rate determined by the first fuel and the second fuel, and relation between a second oxygen concentration at an exhaust gas outlet of the preheater and the heat consumption rate are beforehand obtained, and flow rates of the tertiary air and exhaust from the cooler are adjusted such that both the first oxygen concentration and the second oxygen concentration fall within a range including values of the oxygen concentrations at which the heat consumption rate becomes at its minimum.

Moreover, the invention according to claim 2, which is according to claim 1, is characterized in that the first fuel is fed to the calciner at a certain feed amount, and the second fuel is adjusted at a feed amount required for maintaining it at the burning temperature and fed to the cement kiln.

Notably, in the present invention, the heat consumption rate is the sum total of the heat amounts of pulverized coal, oil coke and the like which are inputted to the cement kiln and the calciner and required for producing 1 kg of clinker. More specifically, it is obtained based on the sum of the product of the calorific value per unit weight of the fuel such as pulverized coal inputted to the cement kiln and the input amount thereof and the product of the calorific value per unit weight of the fuel such as pulverized coal inputted to the calciner and the input amount thereof.

Advantageous Effects of Invention

According to the invention recited in claim 1 or 2, relation between the first oxygen concentration at the exhaust gas outlet of the calciner and the heat consumption rate determined by the first fuel and the second fuel, and relation between the second oxygen concentration at the exhaust gas outlet of the preheater and the aforementioned heat consumption rate are beforehand obtained and, in operation, the first oxygen concentration and the second oxygen concentration are measured, and the flow rate of the tertiary air fed to the calciner from the cooler and the exhaust flow rate from the cooler are adjusted such that both of these concentrations fall within a range including the values of the oxygen concentrations at which the heat consumption rate becomes at its minimum. By the adjustment described above, both the combustion in the calciner and the heat consumption rate can be simultaneously optimized.

DESCRIPTION OF EMBODIMENTS

Figure 1:
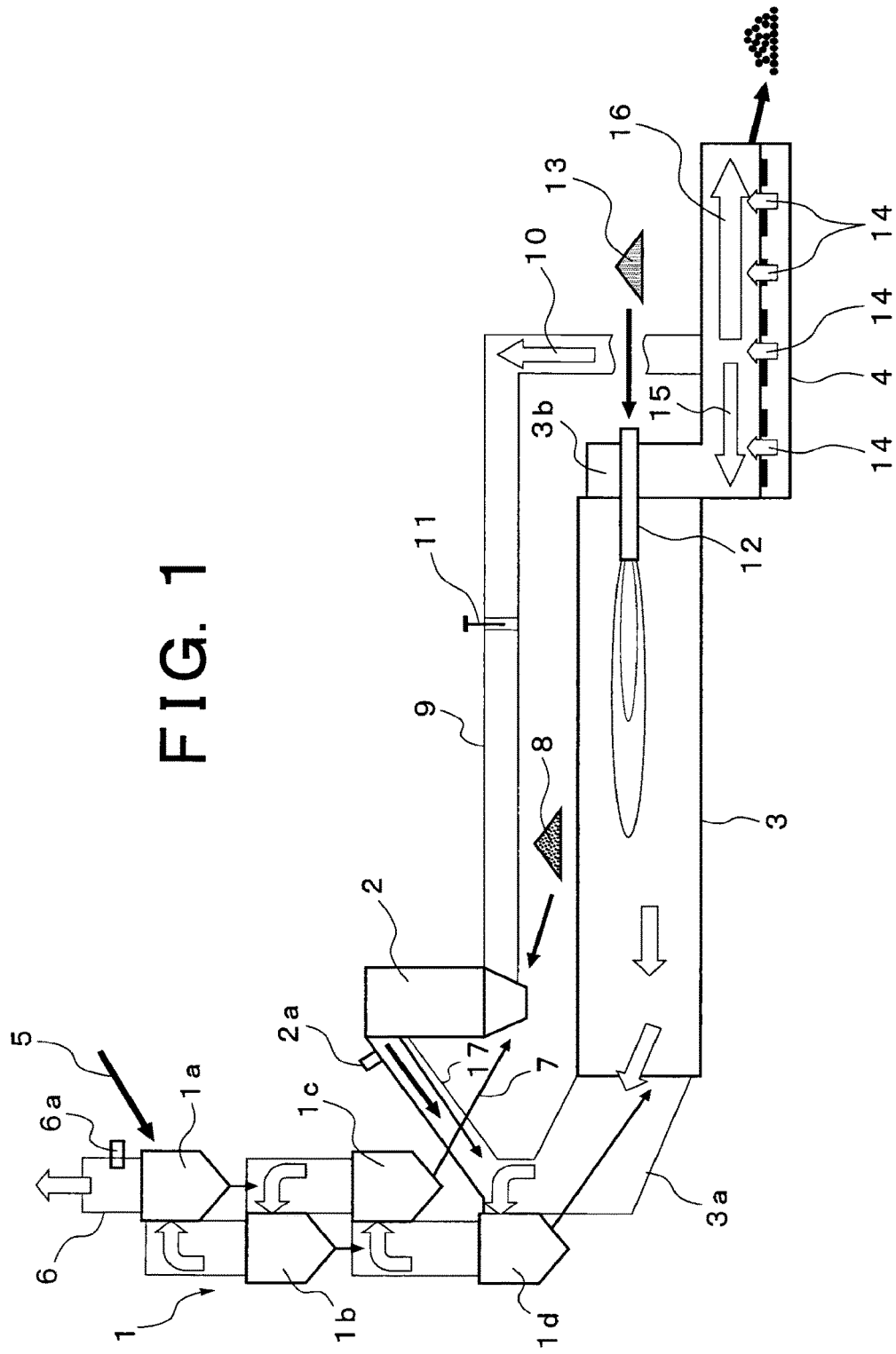
FIG. 1 is a schematic configuration diagram of a cement plant to which an embodiment of the present invention is applied.

First, a configuration of a cement plant to which an embodiment of the present invention is applied is described based on FIG. 1. The cement plant is schematically configured of a preheater 1 preheating a raw material, a calciner 2 calcining at least part of the raw material picked out of the preheater 1, a cement kiln 3 burning the raw material passed through the preheater 1 and the calciner 2 into cement clinker, and a cooler 4 cooling the cement clinker discharged from the cement kiln 3.

Herein, the preheater 1 has a plurality of (in the figure, four stages of) cyclones $1a$ to $1d$ joined in the vertical direction, and is a facility preheating the raw material whose particle size and components are adjusted in a raw material process and which is fed to the uppermost cyclone $1a$ from a feed line 5 with gas at high temperature discharged from the cement kiln 3, in the process of sequentially feeding to the downward cyclones $1b$ to $1d$. Incidentally, the raw material which has been inputted to the uppermost cyclone $1a$ at a temperature of approximately 80° C. reaches the lowermost cyclone $1d$ to have a temperature of 800° C. or more, which leads to decarbonation of limestone as well as preheating.

Meanwhile, in an exhaust line 6 for preheater exhaust gas discharged from the uppermost cyclone $1a$, a not-shown fan is provided, and the preheater exhaust gas is configured to be discharged outside the system by suction of the fan. The preheater exhaust gas is discharged outside the system after heat exchange of combustion exhaust gas discharged from the cement kiln 3 and the calciner 2 and $CO_2$ generated by the decarbonation of the raw material with the raw material between the lowermost cyclone $1d$ and the uppermost cyclone $1a$. In the exhaust line 6, an $O_2$ concentration meter $6a$ measuring an $O_2$ concentration (second $O_2$ concentration) in the preheater exhaust gas is provided. This preheater exhaust gas sensible heat affects, as a heat loss, the heat consumption rate which is a heat consumption amount in the whole system.

Moreover, the calciner 2 partially takes the raw material heated until the preheater $1c$ from a line 7 to perform the decarbonation in order to reduce heat load on the cement kiln 3. The calciner 2 gives heat to the raw material, in which calciner pulverized coal (first fuel) 8 inputted thereto burns with high temperature tertiary air 10 recovered from the cooler 4 via an exhaust line 9. Then, the raw material, unburnt pulverized coal, and exhaust gas which are discharged from the calciner 2 are configured to be introduced into the lowermost cyclone $1d$ of the preheater 1 via a line 17. In the relevant line 17, an $O_2$ concentration meter $2a$ measuring an $O_2$ concentration (first $O_2$ concentration) in the exhaust gas from the calciner 2 is provided. Moreover, in the exhaust line 9, a flow rate adjusting valve 11 is provided for controlling a flow rate of the tertiary air 10.

The aforementioned cement kiln 3 is a cylindrical member which is driven and rotated around its axis line, the inside of which kiln is configured to be held at 1450° C. required for burning the raw material with the combustion gas and radiation from the flame by the raw material heated in the preheater 1 and the calciner 2 being fed to a kiln inlet part $3a$ and by pulverized coal (second fuel) 13 being fed through a main burner 12 provided in a kiln outlet part $3b$ along with primary air for fuel. Then, the raw material fed into the cement kiln 3 from the kiln inlet part $3a$ is heated and completes the decarbonation by heat exchange in the cement kiln 3 in its sending process to the kiln outlet part $3b$ side with the rotation of the cement kiln 3, and is further burnt to form the cement clinker.

Further, in the cement kiln 3, an input amount of the aforementioned pulverized coal is adjusted such that the decarbonation of the raw material and the clinker burning reaction can be performed in accordance with the temperature of the raw material and the decarbonation rate at the inlet, and a flow rate of the combustion primary air and a flow rate of the combustion assisting secondary air 15 fed from the cooler 4 are controlled such that the relevant pulverized coal is completely burnt and the $O_2$ concentration in the exhaust gas at the kiln inlet part $3a$ takes a predetermined value.

Next, the cooler 4 is provided for cooling the clinker discharged from the cement kiln 3, and on its bottom part, cooling air 14 for rapidly cooling the clinker is configured to be fed. A certain amount of cooling air 14 is configured to be fed corresponding to the amount of clinker to be produced. Then, the clinker cooled in the cooler 4 is discharged to have approximately 150° C. at the cooler outlet.

Meanwhile, the air 14 used for cooling becomes to have high temperature by heat exchange with the clinker. A part thereof is fed to the cement kiln 3 as the combustion assisting secondary air 15 in the cement kiln 3, another part of the air is fed to the calciner 2 as the tertiary air 10 as mentioned above, and the rest of the air 16 is discharged outside by a fan provided in a not-shown exhaust line. Similarly to that of the preheater exhaust gas, the sensible heat of this exhaust from the cooler 4 also affects, as a heat loss, the heat consumption rate.

Further, in the cement plant, relation between the first $O_2$ concentration measured by the $O_2$ concentration meter 2a at the exhaust gas outlet of the calciner 2 and the heat consumption rate determined by the feed amount of the pulverized coal 8, 13, and relation between the second $O_2$ concentration measured by the $O_2$ concentration meter 6a at the exhaust gas outlet of the preheater 1 and the aforementioned heat consumption rate are beforehand obtained by process simulation analysis mentioned later.

Then, the number of revolutions of the aforementioned fan provided in the exhaust line from the cooler 4 and the degree of opening of the flow rate adjusting valve 11 provided in the exhaust line 9 are controlled such that both the first and second $O_2$ concentrations fall within a range including the values of the $O_2$ concentrations at which the heat consumption rate becomes at its minimum. By this configuration, the amounts of the tertiary air 10 fed from the cooler 4 to the calciner 2 and exhaust 16 directly discharged from the cooler 4 are adjusted.

Herein, the aforementioned process simulation performed by the inventors and others is specifically described. In the process simulation, each facility is divided into units each of which is called a unit operation. For example, the cyclone is done into a separator, a heat exchanger, a reactor and the like. Then, these are arranged as in a circuit diagram, flows (streams) of solids (powders) and gases are connected therebetween, and the solution is obtained by repeating calculations until their final convergence. Notably, the present process simulation was performed using Aspen Plus v7.2 of Aspen Tech Corporation, which was general purpose process simulation software.

Figure 2:
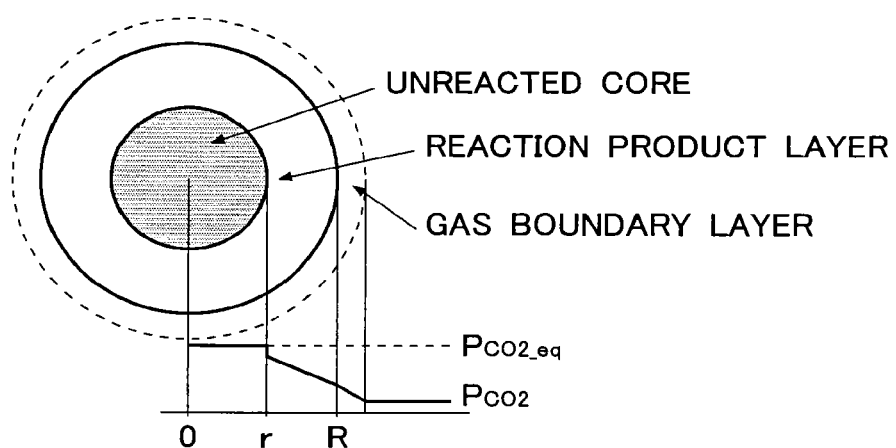
FIG. 2 is a schematic diagram of an unreacted core model used in simulation of the aforementioned embodiment.

Moreover, for the present process simulation, reaction rate models were introduced to the calciner 2 and the lowermost cyclone 1d in which the decarbonation of the cement material and the combustion of the pulverized coal 8 occurred. Moreover, an unreacted core model was adopted as the reaction model for the raw material. As illustrated in FIG. 2, the unreacted core model is a model in which an unreacted part (unreacted core) is present inside the particle and a reaction product layer is formed on the outside thereof. Since the reaction rate varies depending on the diameter of the unreacted core, the calculation in which the variation in reaction rate depending on the reaction ratio is taken into consideration can be performed.

The raw material was configured to have a composition at which clinker for portland cement could be generally manufactured. Moreover, $CaCO_3$ contained in the raw material was configured to change into CaO due to the decarbonation. Assuming that in the decarbonation reaction, the reaction occurred on the surface of the unreacted $CaCO_3$ and the reaction boundary was proportional to the surface area, a grain model was adopted.

In the calculation, taking the influence of diffusion of $CO_2$ in the gas boundary film into consideration, an equilibrium partial pressure $P_{CO2\_eq}$ of $CO_2$ at a predetermined temperature was obtained, and correction was performed using its ratio relative to a $CO_2$ partial pressure in the calculation. As indicated in the following expression, a reaction amount was calculated based on the product of a reaction rate coefficient and a retention time. Notably, for temperature dependency of the equilibrium partial pressure, actual measurements using a thermogravimetry or the like and/or values, for example, in literature ("Thermodynamic evaluation and optimization of the (Ca+C+O+S) system" D. Lindberg and P. Chartrand, J. Chem. Thermo., 41, 2009) or the like can be used.

$$k = A \cdot \exp\left(\frac{-E}{RT}\right) \cdot (1-X)^{2/3} \cdot \left(1 - \frac{P_{CO2}}{P_{CO2\_eq}}\right) \quad \text{[Expression 1]}$$

In Expression 1,
k: Reaction rate [1/s]
A: $2.2 \times 10^8$ [1/s]
E: $2.0 \times 10^5$ [J/mol]
R: Gas constant 8.314
T: Temperature [K]
X: Decarbonation ratio (on a mass-basis)
$P_{CO2}$: $CO_2$ partial pressure in the calculation
$P_{CO2\_eq}$: Equilibrium partial pressure of $CO_2$ at a predetermined temperature.

Moreover, the preheater 1 has the cyclones 1a to 1d joined in the vertical direction, and preheats the raw material with the combustion gas discharged from the cement kiln 2 at high temperature. Thus, the raw material which has been inputted to the uppermost cyclone 1a at a temperature of approximately 80° C. reaches the lowermost cyclone 1d to have a temperature of 800° C. or more, which leads to the decarbonation of $CaCO_3$ as well as preheating.

Furthermore, in the calciner 2, it was configured that a certain amount of raw material and a certain amount of pulverized coal corresponding to this were fed thereto, and the flow rate of the combustion tertiary air 10 was adjusted. Further, it was configured that the decarbonation in the calciner 2 occurred as mentioned above, and the pulverized coal was burnt with reference to literature ("A random pore model for fluid-solid reactions: I. Isothermal, kinetic control", S. K. Bhatia, D. D. Perlmutter, AIChE Journal vol 26, 3 1980) and ("Modeling of coal gasification reaction: Reaction rate and morphological model of coal char gasification", Shiroh Kajitani, Report of Central Research Institute of Electric Power Industry, 2003).

Moreover, in the cement kiln 3, it was configured that the input amount of the pulverized coal was adjusted such that the raw material became the clinker at 1450° C. (burning zone temperature), the flow rate of the secondary air 15 for assisting the combustion was determined such that the oxygen concentration in the exhaust gas at the kiln inlet part 3a was 2% when the pulverized coal was burnt and discharged from the cement kiln 3 as the exhaust gas. Incidentally, the value of 1450° C. is a value at which the clinker burning reaction is typically said to occur, and the value of 2% of oxygen in the exhaust gas is a typical target value in operating a cement plant of the type in which the cement kiln 3 and the calciner 2 are separated.

Further, inside the cement kiln 3, a heat amount which the raw material receives from the combustion gas in heating to 1450° C. with the radiation from the flame of the main burner 12 and the heat exchange with the combustion gas is indicated by the following expression.

$$Q = \alpha \times Q_{combustion\_air} \quad \text{[Expression 2]}$$

α: Heat amount ratio which the raw material receives from the combustion gas $Q_{combustion\_air}$: Sensible heat of the combustion gas [kcal/hr]

It was configured α=0.4 in the present embodiment.

Moreover, the heat exchange between the clinker and the cooling air 14 in the cooler 4 was calculated as the clinker being a fixed layer and the flow being in a crossflow manner. The coefficient of heat transfer was derived from the ranz-marshall expression. The heat transfer amount Q was calculated by obtaining the heat transfer amount q between particles and fluid per unit volume of the stationary layer with reference to literature ("Process kiln", Association of Powder Process Industry and Engineering, JAPAN, Nikkan Kogyo Shimbun Ltd., 1985), and by calculating its product with the volume V of the particles and the correction coefficient F for the crossflow heat exchange obtained with reference to literature ("Mean temperature difference and temperature efficiency for shell and tube heat exchangers connected in series with two tube passes per shell pass", Dodd, R., IChemE, vol. 58, 1980). The particle diameter of the clinker was configured to be 20 mm, and the layer thickness of the clinker deposited inside the cooler was configured to match the thickness in an actual machine.

$$Q = q \cdot F \cdot V = h \cdot a \cdot \Delta T \cdot F \cdot V \quad \text{[Expression 3]}$$

where,

Q: Heat transfer amount [J/s]
q: Heat transfer amount per unit volume [J/m³s]
F: Correction coefficient
V: Volume of the particles [e]
h: Coefficient of heat transfer [J/m²sK]
a: Specific surface area of the particles [1/m]

Moreover, in actual operation, combustion management of the pulverized coal 8 is performed based on the $O_2$ concentration in the exhaust gas from the calciner 2. Hence, the calculation in the case where the flow rate of the tertiary air 10 was adjusted such that the $O_2$ concentration in the exhaust gas of the calciner 2 became 1.5% to 5% according to the actual operation was performed.

Figure 3:
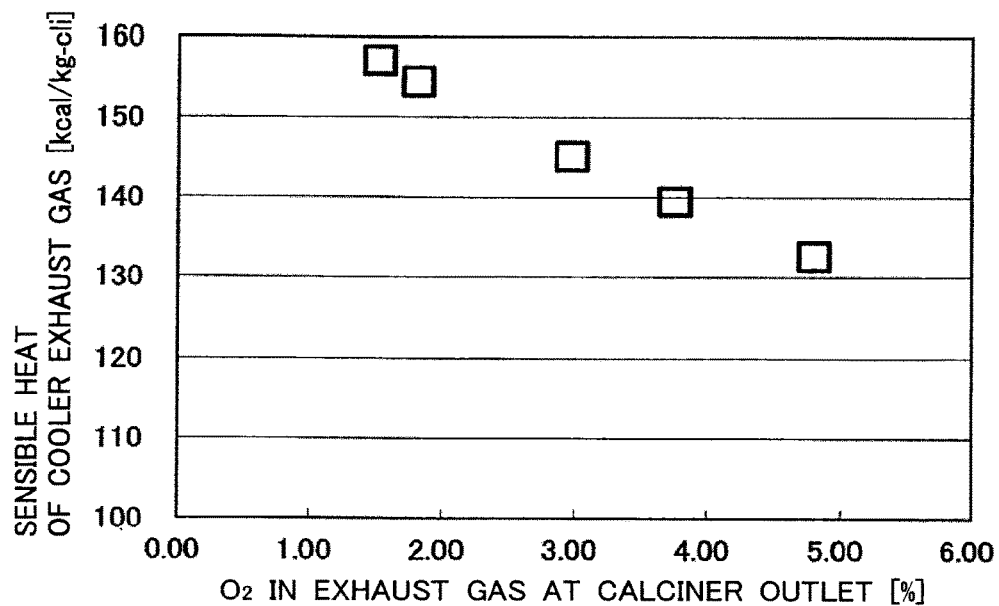
FIG. 3 is a graph illustrating relation between an $O_2$ concentration in exhaust gas at a calciner outlet and sensible heat of cooler exhaust.

As a result, as illustrated in FIG. 3, since the flow rate of the tertiary air 10 recovered as the combustion air of the calciner 2 increases in the cooler 4, the exhaust flow rate from the cooler 4 decreases, and the temperature decreases, which causes decrease of the sensible heat of the exhaust gas.

Figure 4:
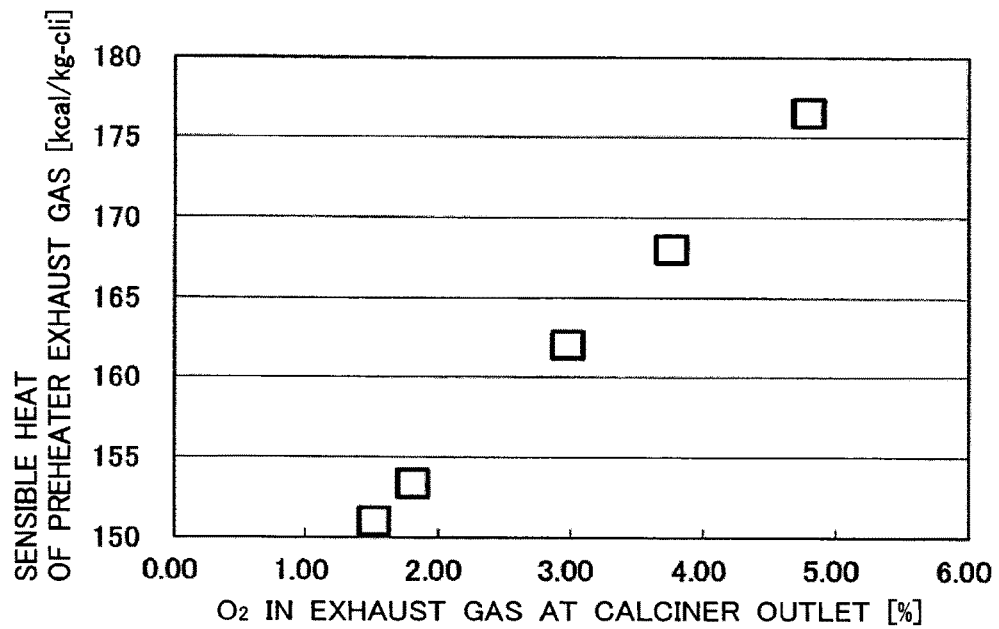
FIG. 4 is a graph illustrating relation between the $O_2$ concentration in the exhaust gas at the calciner outlet and sensible heat of preheater exhaust gas.

Moreover, as illustrated in FIG. 4, when the flow rate of the tertiary air 10 to the calciner 2 is increased, take-away sensible heat from the preheater increases due to increase of the preheater exhaust gas temperature caused by increase of the exhaust gas temperature at the outlet of the lowermost cyclone 1d, and in addition to this, due to increase of the combustion air flow rate.

Figure 5:
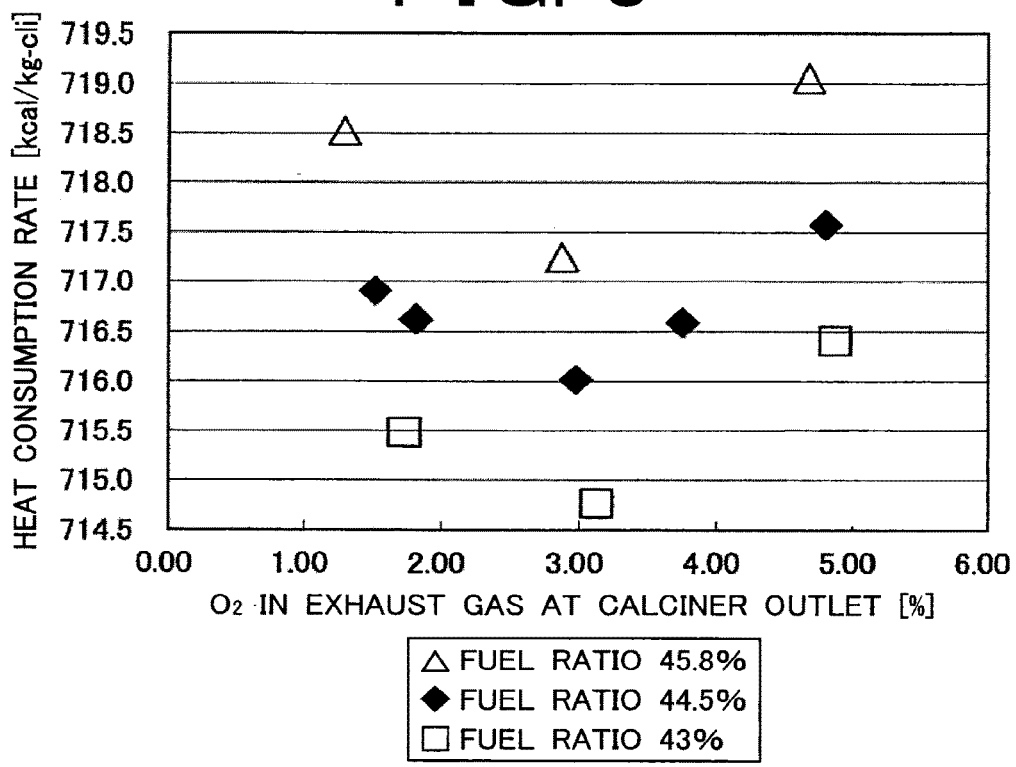
FIG. 5 is a graph illustrating relation between the $O_2$ concentration in the exhaust gas at the calciner outlet and a heat consumption rate.
Figure 6:
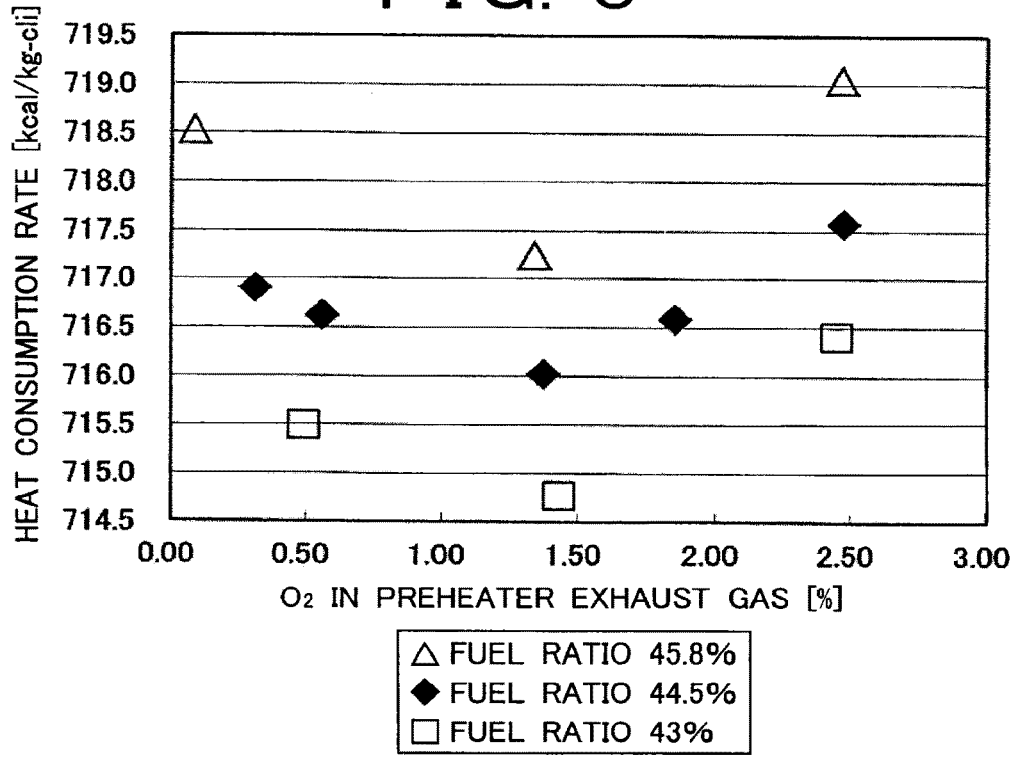
FIG. 6 is a graph illustrating relation between the $O_2$ concentration in the exhaust gas at the preheater outlet and the heat consumption rate.

FIG. 5 illustrates variation of the heat consumption rate in the case where the flow rate of the tertiary air 10 is adjusted such that the $O_2$ concentration in the exhaust gas of the calciner 2 is 1.5% to 5%. Moreover, the $O_2$ concentration in the exhaust gas from the preheater 1 is affected not only by the $O_2$ concentration in the exhaust gas sent from the calciner 2 but also by the $O_2$ concentration in the exhaust gas from the cement kiln 3. FIG. 6 illustrates variation of the $O_2$ concentration in the exhaust gas at the outlet of the preheater 1 and the heat consumption rate.

Notably, in this simulation, relation between the aforementioned $O_2$ concentration and the heat consumption rate was analyzed with respect to each of three kinds of fuel ratios. Herein, the fuel ratio=(heat amount of the fuel inputted to the calciner 2)/(heat amount of the fuel inputted to the cement kiln 3+heat amount of the fuel inputted to the calciner 2).

From FIG. 5 and FIG. 6, in any case of these fuel ratios, it appears that when the flow rate of the combustion air (tertiary air 10) in the calciner 2 is increased, the heat consumption rate does not become monotonously worse but takes the optimum point. This is because the increase of the combustion air (tertiary air 10) to the calciner 2 in order to make the combustion at the calciner 2 better decreases the take-away sensible heat along with the exhaust 16 from the cooler 4, and in addition to this, causes increase of the take-away sensible heat due to the increase of the exhaust gas temperature and the increase of the flow rate from the preheater 1.

Accordingly, the relations presented in FIG. 5 and FIG. 6 are beforehand obtained and, in operation, the first and second oxygen concentrations are measured, and the fan and the flow rate adjusting valve 11 which are provided in the exhaust line from the cooler 4 are controlled such that both of these concentrations fall within a range including the values of the oxygen concentrations at which the aforementioned heat consumption rate becomes at its minimum, to adjust the flow rate of the tertiary air fed to the calciner and the flow rate of the exhaust 16 from the cooler 4. By the adjustment described above, both the combustion at the calciner 2 and the heat consumption rate can be simultaneously optimized. Notably, it is desirable that the $O_2$ concentration in the exhaust gas at the calciner outlet is adjusted to be approximately 2% to 4%, and the $O_2$ concentration in the preheater exhaust gas is adjusted to be approximately 0.5% to 2%.

INDUSTRIAL APPLICABILITY

According to the present invention, there can be provided a method for operating a cement plant capable of simultaneously optimizing both the combustion at the calciner and the heat consumption rate.

REFERENCE SIGNS LIST

1 Preheater
2 Calciner
2a, 6a $O_2$ concentration meter
3 Cement kiln
4 Cooler
8 Pulverized coal (first fuel)
10 Tertiary air
11 Flow rate adjusting valve
13 Pulverized coal (second fuel)
15 Secondary air
16 Exhaust

The invention claimed is:

1. A method for operating a cement plant which includes a preheater that preheats a raw material, a calciner that calcines at least part of the raw material picked out of the preheater, a cement kiln that burns the raw material passed through the preheater and the calciner into cement clinker, and a cooler that cools the cement clinker discharged from the cement kiln, the method comprising:
feeding first fuel in an amount required for calcining the introduced raw material to the calciner;

feeding to the cement kiln, along with combustion primary air, second fuel in an amount required for maintaining an inside of the cement kiln at a burning temperature, and introducing air in a certain amount for cooling the cement clinker to the cooler; and feeding a part of the air as secondary air for assisting combustion of the second fuel to the cement kiln, feeding another part of the air as tertiary air for combustion of the first fuel to the calciner, and discharging the rest of the air from the cooler, wherein relation between a first oxygen concentration at an exhaust gas outlet of the calciner and a heat consumption rate determined by the first fuel and the second fuel, and relation between a second oxygen concentration at an exhaust gas outlet of the preheater and the heat consumption rate are beforehand calculated and obtained, the first oxygen concentration at the exhaust gas outlet of the calciner being measured before the second oxygen concentration at the exhaust gas outlet of the preheater, and flow rates of the tertiary air and exhaust from the cooler are adjusted such that both the first oxygen concentration and the second oxygen concentration fall within a range including values of the oxygen concentrations at which the heat consumption rate becomes at its minimum, whereby both the combustion at the calciner and the heat consumption rate are simultaneously optimized.

2. The method for operating the cement plant according to claim 1, wherein the first fuel is fed to the calciner at a certain feed amount, and the second fuel is adjusted at a feed amount required for maintaining it at the burning temperature and fed to the cement kiln.

3. The method according to claim 1, wherein the oxygen concentration in the exhaust gas at the calciner outlet is adjusted to be approximately 2% to 4%, and the oxygen concentration in the preheater exhaust gas is adjusted to be approximately 0.5% to 2%.

4. The method according to claim 1, wherein the oxygen concentration measurement in the exhaust gas outlet of the calciner is taken before the exhaust gas of the calciner is mixed with the exhaust gas of the cement kiln.

* * * * *